United States Patent Office 3,494,880
Patented Feb. 10, 1970

3,494,880
POLYURETHANE FOAMS PREPARED FROM STABILIZED POLYETHER POLYOLS
Arthur L. Austin, Southgate, Mich., assignor to Wyandotte Chemicals Corporation, Wyandotte, Mich., a corporation of Michigan
No Drawing. Original application Feb. 28, 1966, Ser. No. 530,318, now Patent No. 3,437,694, dated Apr. 8, 1969. Divided and this application Jan. 23, 1969, Ser. No. 793,589
Int. Cl. C08g 51/54, 41/04, 22/44
U.S. Cl. 260—2.5
4 Claims

ABSTRACT OF THE DISCLOSURE

Polyether polyols stabilized by incorporating therewith certain combinations of phenolic additives such as 2,6-di-t-butyl-4-methylphenol and 2,4-dimethyl-6-t-butylphenol have been found to synergistically inhibit color formation when employed in the preparation of polyurethane foams.

---

The present application is a division of copending U.S. patent application Ser. No. 530,318, filed Feb. 28, 1966, now U.S. Patent 3,437,694.

The present invention relates to the use of stabilized polyether polyol compositions in the praparation of polyurethane foams. More particularly, the invention relates to certain stabilizer combinations which synergistically improve the oxidative stability of polyether polyols and inhibit the formation of color in polyurethane foams prepared from the stabilized polyether polyols.

Polyurethane foams are well known in the art. They are generally prepared by the catalyzed reaction, in the presence of a blowing agent, of an organic polyisocyanate with a hydroxyl-terminated compound. For several reasons, polyether polyols have been found to be a particularly useful hydroxyl-terminated compound in the preparation of polyurethane foams. One disadvantage encountered when such compounds are employed in polyurethane foam preparation is that the foam discolors. This discoloration is often the result of oxidative material present in the polyether polyols since it is well known that polyether polyols are readily oxidized by air and that the oxidation is accelerated by heat. However, the presence of oxidative material in the polyol is not the only cause of discoloration in polyurethane foams. Often, stabilizers, particularly phenolic compounds, are added to polyether polyols to inhibit the oxidation and discoloration thereof. Although these stabilizers have been partially effective for these purposes, most of them lose their effectiveness when the polyols are employed in the preparation of polyurethane foams and, as a result, fail to inhibit color formation of the foam. precisely why this occurs is not known. As a result, most phenolic compounds, although they might ostensibly appear to stabilize polyether polyols against discoloration, adversely affect the use of these polyols in polyurethane foam preparation.

Accordingly, it is an object of the present invention to provide for polyether polyols which inhibit discoloration when employed in the preparation of polyurethane foams. Another object of the invention is to provide for the use of phenolic compounds as stabilizers for polyether polyols and for polyurethane foams prepared therewith. These and other objects of the invention will be apparent from the specification and examples which follow.

Now, in accordance with the present invention, it has been determined that polyether polyols stabilized against oxidation by incorporating therewith certain phenolic combinations synergistically inhibit color formation when employed in the preparation of polyurethane foams. As demonstrated hereinafter, it was both surprising and unexpected that certain phenolic combinations co-act in such an efficacious manner.

The combinations of phenolic additives which are useful in the present invention are:

(a) 2,6-di-t-butyl-4-methylphenol and 2,4-dimethyl-6-t-butylphenol;
(b) 2,6-di-t-butyl-4-methylphenol and hydroquinone; and
(c) 2,6-di-t-butyl-4-methylphenol and catechol.

The total amount of the combination which is generally employed in accordance with this invention is from 0.05 part to about 0.5 part, preferably from about 0.1 part to about 0.2 part per 100 parts of polyether polyol. The amount will depend upon the particular polyol which is to be stabilized. It is to be understood that any amount which synergistically affects the stability of the polyol is within the scope of the present invention. Generally, equal amounts of each additive will be employed, although unequal amounts may also be employed. However, each mixture of additives should generally contain at least 30 weight percent of each of the additives.

The polyether polyols which may be employed in the present invention are those compounds having at least two hydroxyl groups. They are generally prepared by the catalytic polymerization of an alkylene oxide or a mixture of alkylene oxides, in the presence of an initiator which is an organic compound having at least two active hydrogen atoms. The lower alkylene oxides such as ethylene oxide, propylene oxide and butylene oxide are preferred. Numerous organic compounds having at least two active hydrogen atoms may be employed as initiators. Preferred compounds are polyhydric alcohols such as ethylene glycol, propylene glycol, the isomeric n-butylene glycols, 1,5-pentane diol, 1,6-hexane triol, glycerol, trimethylolpropane, sorbitol, sucrose, α-methyl glucoside and pentaerythritol. Other useful compounds include organic acids such as adipic acid, succinic acid, aconitic acid and trimellitic acid; inorganic acids such as the phosphoric acids; amines such as methyl amine, ethyl amine, ethylene diamine, diethylene triamine, toluene diamine, aniline, methylene dianiline, piperazine and triisopropanol amine; phenolic compounds such as bisphenol, pyrogallol, resorcinol, inositol; mercaptans such as 1,2-ethanedithiol and 1,2,3-propanetrithiol, and acid amides such as acetamide and benzene sulfonamide. Mixtures of any of the above may also be employed. Particularly preferred polyether polyols are those derived from a $C_1$–$C_4$ alkylene oxide such as propylene oxide and a polyhydric alcohol such as trimethylolpropane, propylene glycol or glycerol said polyols having molecular weights from about 400 to 30,000.

The preparation of polyurethane foams from the stabilized polyether polyols of the present invention may follow any of the standard prior art procedures. Thus, the so-called "prepolymer," "quasi prepolymer" or "one-shot" method may be employed. Along with the stabilized polyether polyols, an organic polyisocyanate, a catalyst, a surfactant and a blowing agent are generally employed. Various other additives, all well known in the art, may also be employed if desired. The preparation of polyurethane foams and the reactants employed in the preparation are well known in the art as evidenced by U.S. Patent Nos. 3,072,582; 3,091,551 and 3,112,281, all of the disclosures thereof incorporated herein by reference thereto.

The following examples illustrate the invention. All parts are by weight unless otherwise stated.

EXAMPLE I

The polyether polyol employed in this example was a 3000 molecular weight polyether triol prepared from propylene oxide and glycerol. Stability tests on the polyol were carried out as follows.

In each test, a vessel, equipped with bubbler, thermometer, stirrer and air outlet, was charged with the above polyol and various candidate stabilizers. After thoroughly mixing the charge, air was bubbled therethrough and heat was applied thereto for a total of five hours. At one hour intervals, samples were removed from the vessel. At each interval, the color of the polyol was observed. If the polyol was highly colored, no additional tests were carried out on the polyol since it was apparent that any foam prepared therefrom would also be discolored. In certain instances, although the polyol was discolored, further tests were conducted for comparison purposes. Those stabilizers that effectively inhibited color formation of the polyol were further tested as follows.

Each sample of the stabilized polyol, upon being removed from the vessel as described above, was then placed in a glass container and nitrogen was bubbled therethrough for about ten minutes. To the container, tolylene diisocyanate (80/20 mixture of 2,4/2,6 isomers) was then added and the container was vigorously shaken. Heat was applied to the container for about five hours and thereafter the color of the polyol was observed and compared with color standards. The amount of color formed is directly correlatable to the amount of oxidized material present in the polyol and to the effectiveness of the stabilizer in the presence of an isocyanate, the latter correlation being particularly important if it is desirable to employ the stabilized polyol in polyurethane foams.

The color standards employed in this test were:

(0)—water;

(1)—1 part of a solution prepared by diluting 0.1 part of sodium chromate to 250 parts with a 20% solution of ethanol in water+40 parts of water;

(2)—2 parts of the solution used in (1) above+40 parts of water;

(3)—0.5 part of solution prepared by diluting 0.1 part of Bromthymol blue to 500 parts with water containing 2 parts of dilute HCl+40 parts of water, and (4)—1 part of the solution used in (3) above+40 parts of water.

Thus, at various intervals the degree of color of the polyol tested was determined to be a number from 0 to 4. For the purposes of this application, only those polyols that recorded a 0 or 1+ rating over the five hours were effectively stabilized against oxidation and did inhibit the formation of color when employed in polyurethane foams.

Table 1 shows the results obtained when various candidate stabilizers were tested as described above.

TABLE 1.—POLYOL STABILITY TESTS

| Candidate Stabilizer | Part/100 pts. of Polyol | Color of Polyol After Heating for One Hour at 115° C. and Then for Four Hours at 125° C. | | | | | Color Rating After Testing Each Sample with TDI. Sample removed after— | | | | |
|---|---|---|---|---|---|---|---|---|---|---|---|
| | | 1 hr. | 2 hrs. | 3 hrs. | 4 hrs. | 5 hrs. | 1 hr. | 2 hrs. | 3 hrs. | 4 hrs. | 5 hrs. |
| None | | Y[1] | | | | | [2]>3 | | | | |
| A | 0.2 | Cl | Cl | Cl | Y | | 0 | 1 | 3 | >3 | |
| A | 0.1 | Cl | Cl | Cl | Cl | | 0 | 2 | 3 | >3 | |
| B | 0.2 | Y | BY | BY | | | 1 | >3 | >4 | | |
| B | 0.1 | Cl | BY | BY | BY | BY | 1 | 2 | 3 | 3 | >3 |
| C | 0.2 | Cl | Cl | Cl | | | 2 | 2 | >3 | | |
| C | 0.1 | Cl | Cl | Cl | | | 2 | 3 | 3 | >3 | |
| D | 0.2 | Y | BY | | | | 2 | >4 | | | |
| D | 0.1 | Y | BY | | | | 1 | 4 | | | |
| A / B | 0.1 / 0.1 | Cl | Cl | Cl | Cl | Cl | 0 | 0 | 0 | 0–1 | 0–1 |
| A / C | 0.1 / 0.1 | Cl | Cl | Cl | Cl | Cl | 0 | 0 | 0 | 0–1 | 0–1 |
| A / D | 0.1 / 0.1 | Cl | Cl | Cl | Cl | | 0 | 0 | 0 | 0–1 | |

[1] Unstabilized polyol at room temperature.
[2] Unstabilized polyol treated with TDI (before heating).

NOTE.—A=2,6-di-t-butyl-4-methylphenol; B=2,4-dimethyl-6-t-butyphenol; C=Hydroquinone; D=Catechol; Cl=Clear; Y=Yellow; BY=Bright Yellow.

The results presented in Table 1 show the surprising synergistic effect of the stabilizer combinations of the present invention. To illustrate, a polyol containing 0.2 part of stabilizer A per 100 parts of polyol recorded a rating of 3 after three hours. A polyol containing the same amount of stabilizer B recorded a rating of 3 after two hours. However, a polyol containing a mixture of 0.1 part of A and 0.1 part of B after five hours only recorded a rating of between 0–1. A polyol containing the same amount of A or B (0.1 part per 100 parts of polyol) employed separately also recorded ratings of 3 within three hours. Similar data are presented for each of the three combinations of the present invention. A number of other candidate stabilizers and combinations were incorporated into the polyol of this example but they failed to give the results demonstrated for the select combination of the present invention. These candidates included resorcinol, 2-t-4-methylphenol, bisphenol A, pyrogallol, resorcinol plus stabilizer B and resorcinol plus stabilizer A.

EXAMPLE II

Various concentrations of 2,6-di-t-butyl-4-methylphenol (A) and 2,4-dimethyl-6-t-butylphenol (B) were tested to determine the ratios of the additives which are operable in the present invention. The results appear in Table 2.

TABLE 2.—POLYOL STABILITY TESTS

| Parts of stabilizer | | | Color of Polyol After Heating for One Hour at 115° C. and Then for Four Hours at 125° C. | | | | | Color Rating After Testing Each Sample with TDI. Sample removed after— | | | | |
|---|---|---|---|---|---|---|---|---|---|---|---|---|
| A | B | Ratio A/B | 1 hr. | 2 hrs. | 3 hrs. | 4 hrs. | 5 hrs. | 1 hr. | 2 hrs. | 3 hrs. | 4 hrs. | 5 hrs. |
| .2 | | | Cl | Cl | Cl | Y | | 0 | 1 | 3 | >3 | |
| .1 | .05 | 2:1 | Cl | Cl | Cl | Cl | Cl | 0 | 0 | 0 | 0–1 | 1 |
| .1 | .1 | 1:1 | Cl | Cl | Cl | Cl | Cl | 0 | 0 | 0 | 0–1 | 0–1 |
| .05 | .05 | 1:19 | Cl | Cl | Cl | Cl | Cl | 0 | 0 | 0–1 | 1 | 1 |
| .05 | .1 | 1:2 | Cl | Cl | Cl | Cl | Cl | 0 | 1 | 1 | 1 | 1 |
| | .2 | | Y | BY | BY | | | 1 | >3 | >4 | | |

NOTE.—Cl=Clear; Y=Yellow; BY=Bright Yellow.

EXAMPLE III

The stability of a polyether polyol having a molecular weight of about 3500 prepared by the condensation of a mixture of ethylene oxide and propylene oxide with glycerol was tested as described in Example I. The stabilizer combination was the same as employed in the previous example. The results of the test presented in Table 3 indicate that neither candidate stabilizer A nor candidate stabilizer B, when employed alone, effectively stabilize the polyether polyol. However, a surprising synergistic effect is obtained when a combination of A and B is employed.

Similar results are obtained when the polyether polyols tested are:

(1) 700 molecular weight glycol prepared by the condensation of propylene oxide with propylene glycol;

(2) 12,000 molecular weight triol prepared by the condensation of a mixture of ethylene oxide and butylene oxide with trimethylolpropane, and (3) 5000 molecular weight polyol prepared by the condensation of propylene oxide and bisphenol A.

EXAMPLE IV

A polyurethane foam (A) was prepared from the following ingredients employing the "one-shot" method. evaluate the effectiveness of the stabilizers. The color of the foams was observed and the foams were rated as in Table 4. The rating is from best to worst.

TABLE 3.—POLYOL STABILITY TESTS

| Candidate Stabilizer | Part/100 pts. of Polyol | Color of Polyol After Heating for One Hour at 115° C. and Then for Four Hours at 125° C. | | | | | Color Rating After Testing Each Sample with TD Sample removed after— | | | | |
|---|---|---|---|---|---|---|---|---|---|---|---|
| | | 1 hr. | 2 hrs. | 3 hrs. | 4 hrs. | 5 hrs. | 1 hr. | 2 hrs. | 3 hrs. | 4 hrs. | 5 hrs. |
| None | | BY [1] | | | | | [2] >3 | | | | |
| A | 0.2 | Cl | Cl | Cl | | | 0-1 | 0-1 | 1 | 2-3 | 3 |
| B | 0.2 | Y | BY | BY | | | 2 | >3 | 4 | | |
| A | 0.1 } Cl | Cl | Cl | Cl | Cl | | | | | | |
| B | 0.1 | | | | | | 0 | 0 | 0 | 0-1 | 0-1 |

[1] Unstabilized polyol at room temperature.
[2] Unstabilized polyol treated with TDI (before heating).
NOTE.—A=2,6-di-t-butyl-4-methylphenol; B=2,4-dimethyl-6-t-butylphenol; Cl=Clear; Y=Yellow; BY=Bright Yellow.

TABLE 4.—STABILIZER EVALUATION

Foam color ratings (1) Foam G (no discoloration)
(2) Foam H (no discoloration)
(3) Foam D (light yellow)
(4) Foam C (light yellow)
(5) Foam B (light yellow)
(6) Foam E (yellow)
(7) Foam F (yellow)
(8) Foam A (deep yellow)

From Table 4 it is apparent that the foams prepared utilizing a mixture of 2,4-dimethyl-6-t-butylphenol and 2,6-di-t-butyl-4-methylphenol were without color, whereas all of the other foams were discolored.

EXAMPLE V

Polyurethane foams are prepared as described in Example IV with the exception that the polyether polyol employed in each series of experiments was varied. The polyols tested are those four polyols described in Example

| Ingredient: | Parts |
|---|---|
| Polyol of Example I | 100 |
| Water | 4.3 |
| Silicone lubricant | 1.6 |
| Halogenated hydrocarbon blowing agent | 3.5 |
| Triethylene diamine | 0.3 |
| N-ethylmorpholine | 0.15 |
| Stannous octoate | 0.60 |
| Tolylene diisocyanate | 55.1 |

In addition to the above ingredients, Foam B was prepared employing 0.05 part of 2,6-di-t-butyl-4-methylphenol; Foam C employing 0.1 part of 2,6-di-t-butyl-4-methylphenol; Foam D employing 0.2 part of 2,6-di-t-butyl-4-methylphenol; Foam E employing 0.05 part of 2,4-dimethyl-6-t-butylphenol; Foam F employing 0.2 part of 2,4-dimethyl-6-t-butylphenol; Foam G employing 0.05 part of 2,6-di-t-butyl-4-methylphenol and 0.05 part of 2,4-dimethyl-6-t-butylphenol; and Foam H employing 0.1 part of 2,6-di-t-butyl-4-methylphenol and 0.1 part of 2,4-dimethyl-6-t-butylphenol.

The physical properties of all of the foams were tested. No significant difference in the properties was noted. The foams were forced cured at 300° F. for five hours to III. Results similar to those described in Example IV are obtained.

EXAMPLE VI

The procedure described in Example IV is duplicated with the single exception that hydroquinone is substituted for 2,4-dimethyl-6-t-butylphenol. Results similar to those described in Example IV are obtained.

What is claimed is:

1. A polyurethane foam prepared by the reaction of an organic polyisocyanate with a polyether polyol in the presence of a blowing agent, said polyether polyol being a condensation product of an alkylene oxide or a mixture of alkylene oxides and a polyhydric alcohol said product stabilized against oxidation with from about 0.05 to about 0.5 part per 100 parts of said product a combination of 2,6-di-t-butyl-4-methylphenol and 2,4-dimethyl-6-6-butylphenol.

2. The foam of claim 1 wherein the polyether polyol is a condensation product of propylene oxide and a polyhydric alcohol.

3. The foam of claim 1 wherein the polyhydric alcohol is glycerol, trimethylolpropane or propylene glycol.

4. The foam of claim 1 wherein the condensation product is stabilized with from 0.1 to 0.2 part of the combination of phenolic compounds per 100 parts of condensation product.

References Cited

UNITED STATES PATENTS 2,942,033  6/1960  Leis et al. _____ 260—611.5
3,144,431  8/1964  Dolce et al. _____ 260—611.5
3,388,169  6/1968  Tyre et al. _____ 260—611.5

FOREIGN PATENTS 748,856  5/1956  Great Britain.

DONALD E. CZAJA, Primary Examiner
MICHAEL B. FEIN, Assistant Examiner

U.S. Cl. X.R.
260—45.95